United States Patent
Bungert et al.

(10) Patent No.: US 9,195,923 B2
(45) Date of Patent: Nov. 24, 2015

(54) IN-LINE DOCUMENT PUNCHER/VOIDER IN A DOCUMENT PERSONALIZATION MACHINE

(75) Inventors: Lyle C. Bungert, Lakeville, MN (US); Bryan D. B. Hoeve, Farmington, MN (US); George Harvey, Plymouth, MN (US)

(73) Assignee: ENTRUST DATACARD CORPORATION, Shakopee, MN (US)

(*) Notice: Subject to any disclaimer, the term of this patent is extended or adjusted under 35 U.S.C. 154(b) by 2067 days.

(21) Appl. No.: 11/627,056

(22) Filed: Jan. 25, 2007

(65) Prior Publication Data

US 2008/0179392 A1   Jul. 31, 2008

(51) Int. Cl.
*G06K 5/00* (2006.01)
*G06K 17/00* (2006.01)
*B42D 25/29* (2014.01)
*B42D 25/00* (2014.01)

(52) U.S. Cl.
CPC ............ *G06K 17/00* (2013.01); *B42D 25/00* (2014.10); *B42D 25/29* (2014.10); *G06K 2017/0041* (2013.01)

(58) Field of Classification Search
CPC .......... B65H 2220/02; B65H 2220/01; B65H 2220/11; B65H 2511/514; B65H 2513/41; B65H 2513/51; B65H 2511/22; B65H 2511/414; B65H 2513/50; B65H 2515/34; B65H 9/101; B65H 2220/15; B65H 2301/5152
USPC ....................................................... 235/380
See application file for complete search history.

(56) References Cited

U.S. PATENT DOCUMENTS

| | | | | |
|---|---|---|---|---|
| 3,985,056 A | * | 10/1976 | Oseto | ............................... 83/552 |
| 5,426,283 A | | 6/1995 | Berthozat et al. | |
| 5,533,955 A | * | 7/1996 | Cann et al. | .................... 493/342 |
| 5,762,431 A | | 6/1998 | Pawelka et al. | |
| 5,886,726 A | | 3/1999 | Pawelka et al. | |
| 6,315,283 B1 | | 11/2001 | Haas et al. | |

(Continued)

FOREIGN PATENT DOCUMENTS

CN   1882439   12/2006

OTHER PUBLICATIONS

International Search Report of International Application No. PCT/US2007/087193.

(Continued)

*Primary Examiner* — Thien M Le
*Assistant Examiner* — Tae Kim
(74) *Attorney, Agent, or Firm* — Hamre, Schumann, Mueller & Larson, P.C.

(57) ABSTRACT

Document personalization machines with a mechanism designed to operate as an in-line document puncher/voider. The document personalization machine includes a document personalization mechanism that performs a personalization operation on the document, a document transport mechanism that transports the document along a document path through the document personalization machine and a document punch mechanism that creates a punch hole on the document. The document can be, for example, a card such as a financial (e.g. credit and debit) card, drivers' license, and a national identification document, or another documents such as a passport. A punched hole can, for example, indicate that the document is void, destroy a magnetic stripe, integrated circuit chip or other information storage medium on the document, or provide access for a lanyard, a key ring and the like.

12 Claims, 6 Drawing Sheets

(56) References Cited

U.S. PATENT DOCUMENTS

| | | |
|---|---|---|
| 6,431,537 B1 | 8/2002 | Meier |
| 6,512,594 B1 | 1/2003 | Lenz et al. |
| 6,536,758 B2 | 3/2003 | Meier et al. |
| 6,883,410 B2* | 4/2005 | Kurita et al. .................. 83/220 |
| 2003/0036468 A1* | 2/2003 | Blank et al. .................. 493/8 |
| 2004/0144221 A1* | 7/2004 | Ferrara et al. .................. 83/13 |
| 2005/0104281 A1* | 5/2005 | Stender et al. .................. 271/185 |
| 2005/0159287 A1* | 7/2005 | Kaneko et al. .................. 493/421 |
| 2006/0175395 A1* | 8/2006 | Paulson et al. .................. 235/380 |
| 2007/0007720 A1* | 1/2007 | Shay et al. .................. 271/265.01 |

OTHER PUBLICATIONS

Written Opinion of the International Searching Authority of International Application No. PCT/US2007/087193.

"Informational Statement"; prepared by Applicant's representative dated Apr. 5, 2007; 1 page.

CPS 800 Desktop card personalization system based on thermography printing, Nov. 27, 2006; 2 pages.

* cited by examiner

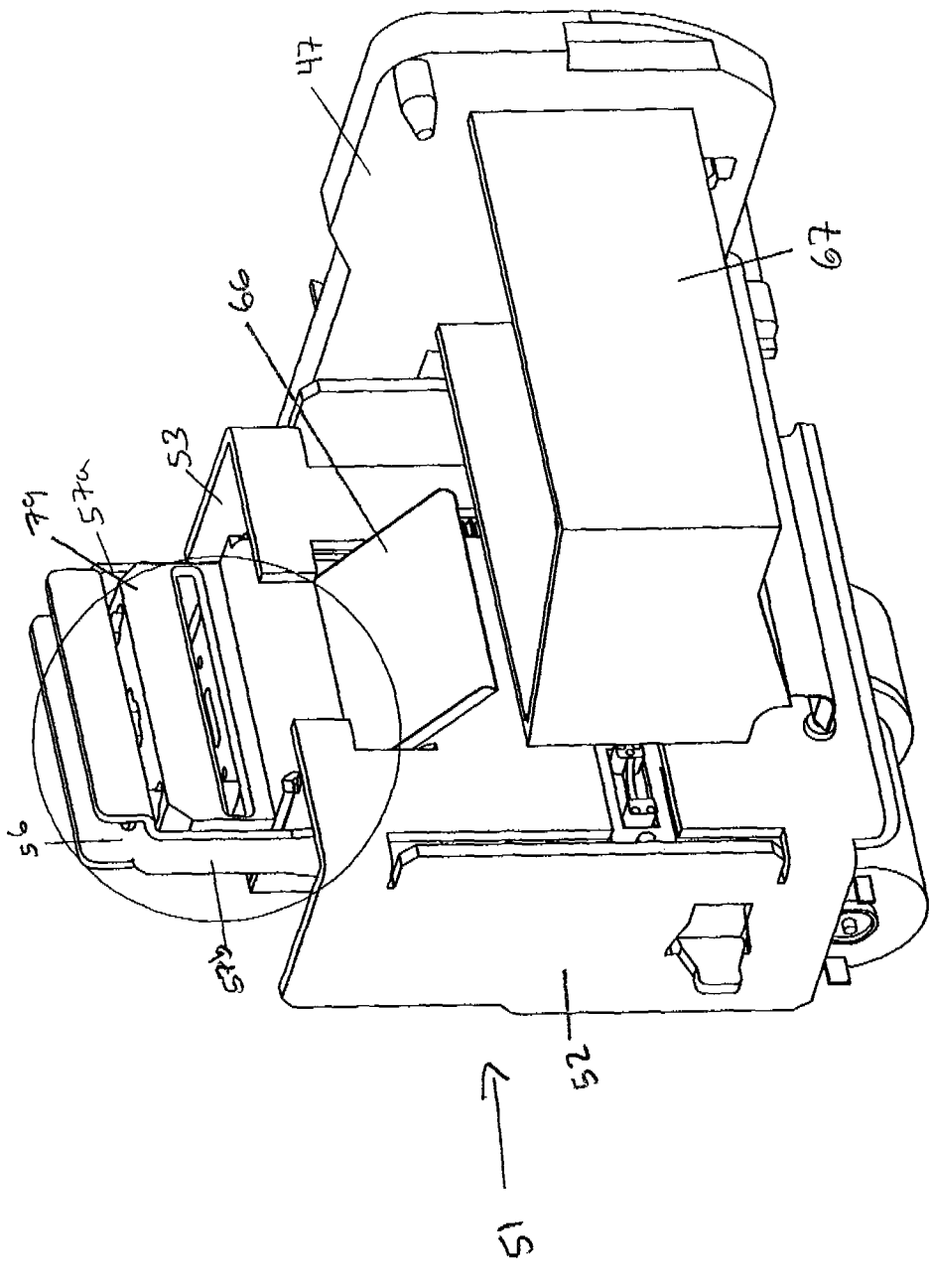

ID-LINE DOCUMENT PUNCHER/VOIDER IN A DOCUMENT PERSONALIZATION MACHINE

FIELD

This disclosure relates to document personalization machines, particularly personalization machines that perform one or more personalization operations on a document, such as a credit card, driver's license, identification card, passport and the like. More particularly, this disclosure relates to the personalization operation of an in-line document puncher/voider within a document personalization machine.

BACKGROUND

The use of personalization machines for personalization of documents is known. In such equipment, a document to be personalized is input into the personalization machine, one or more personalization operations are performed on the input document, and the document is then output from the personalization machine. The personalization operations performed on the document by known personalization machines include one or more of printing, laminating, laser engraving, magnetic stripe encoding, programming of a chip embedded in the document, and the like.

The personalization machine is often configured in the form of a unit that can perform one or more document personalization operations within a single housing. Commercial examples of document personalization machines include the SP55 Card Printer and the SP75 Card Printer each of which is available from DataCard Corporation of Minneapolis, Minn. Examples of personalization machines that perform printing are disclosed in U.S. Pat. Nos. 5,426,283; 5,762,431; 5,886,726; 6,315,283; 6,431,537; and 6,536,758. Of these, U.S. Pat. No. 5,426,283 describes a unit that performs chip programming in addition to printing.

It is often necessary to punch a hole in a personalized document to permit connection of a lanyard, key ring, etc. A hole can also be used to indicate that the document is void and thereby prevent issue or use of the document. A hole can also be used to destroy all or a portion of an information containing portion of a document, such as a magnetic stripe or an integrated circuit chip on a card, thereby preventing access to information stored in those areas.

Prior solutions to creating a punch hole in a personalized document such as a card include hand held punchers, hand actuated table top punchers, and electric punch machines. These prior punch devices are separate from the personalization machine and are typically used after the document has been personalized and discharged from the personalization machine. This means that the punch device takes up separate working space near the machine. In addition, the punch device can be easily removed from the working space, making the punch device unavailable when needed.

There is a need for a document personalization machine that can perform traditional personalization operations, such as printing, as well as inline document punching/voiding.

SUMMARY

A document personalization machine that is capable of performing one or more traditional personalization operations, for example printing, laminating or magnetic stripe programming, on a document, as well as punching a hole or multiple holes of any shape and in any location on the document. The hole can be used to indicate that the document is void, to destroy a magnetic stripe, integrated circuit chip or other information storage medium on a document, or provide access for a lanyard, a key ring and the like.

Embodiments of a document personalization machine with a mechanism designed to operate as an in-line document puncher/voider are shown in the attached drawings. The document personalization machine includes a machine housing and an input whereby a document enters the document personalization machine. Within the machine is a document personalization mechanism that can perform a personalization operation on the document, a document transport mechanism that can transport the document along a transport path through the document personalization machine and a document punch mechanism that can create a punch hole of any size and in any location, including the perimeter edges, on the document.

The document punch mechanism can be a dead-end document punch mechanism where it is located at the end of a transport path. The document punch mechanism can also be a pass through document punch mechanism where it is located at any intermediate location along a transport path.

The document punch mechanism is configured to create one or more punch holes of different shapes, types and sizes and upon any location of a document including a document's perimeter edges. A punch hole can include, but is not limited to, an indentation, perforation, void, notch, serration or the like on a document. However, the punch mechanism does not destroy the document, thereby permitting later inventory tracking procedures to take place and permitting investigation as to why a document needed to be voided in the case of a voided card.

The dead-end document punch mechanism is designed as a modular assembly in which the entire mechanism is insertable and removable as a single unit into and from a document personalization machine, and all elements necessary for the operation of the mechanism, except for electrical power and command signals, are integrated into the mechanism. In addition, the mechanism is integrated into the document personalization machine using a fastenerless assembly in which no screws, bolts, or rivets are used to connect the mechanism to the machine.

Further, the housing of the document personalization machine can also comprise a cover that can be opened to provide access to the interior of the machine and a removable waste bin positioned near the document punch mechanism. The waste bin stores remnants punched from documents.

DRAWINGS

FIG. 5A is another perspective view of the pass-through document punch mechanism.

DETAILED DESCRIPTION

This disclosure relates to mechanisms for an in-line document puncher/voider within a document personalization machine. The documents can be cards, such as financial (e.g. credit and debit) cards, drivers' licenses, and national identification documents, or other documents such as passports. To facilitate the description, the description will hereinafter refer to the document as a card, and the personalization machine as a card personalization machine. It is to be realized that the document is not limited to cards and can be any document on which a personalization operation is performed.

The card personalization machine described herein is configured to perform one or more traditional personalization operations on a card. Traditional personalization operations that can be performed on the card include one or more of at least the following exemplary personalization operations: multi-color printing, monochromatic printing, laminating, document cleaning, magnetic stripe encoding, laser printing, embedded computer chip programming, card de-bowing, indent printing and embossing. Other card personalization operations would be encompassed by the concepts described herein as well. The card personalization machine will be described herein as including printing and a document punch mechanism. However, other traditional personalization operations can be implemented with or replace printing.

The document punch mechanism is configured to create one or more punch holes of different shapes, types and sizes and at any location on a card including a card's perimeter edges. A punch hole can include, but is not limited to, an indentation, perforation, void, notch, serration or the like on a card.

Two separate embodiments are described in detail below. The first embodiment describes a card personalization machine wherein a card punch mechanism is located at the end of a transport path. This type of card punch mechanism is hereinafter referred to as a dead-end card punch mechanism. The second embodiment describes a card personalization machine wherein the card punch mechanism is located along a transport path such that the transport path is on each side of the card punch mechanism allowing the card to pass through the card punch mechanism. This type of card punch mechanism is hereinafter referred to as a pass-through card punch mechanism.

Dead-End Card Punch Mechanism

Figure 1:
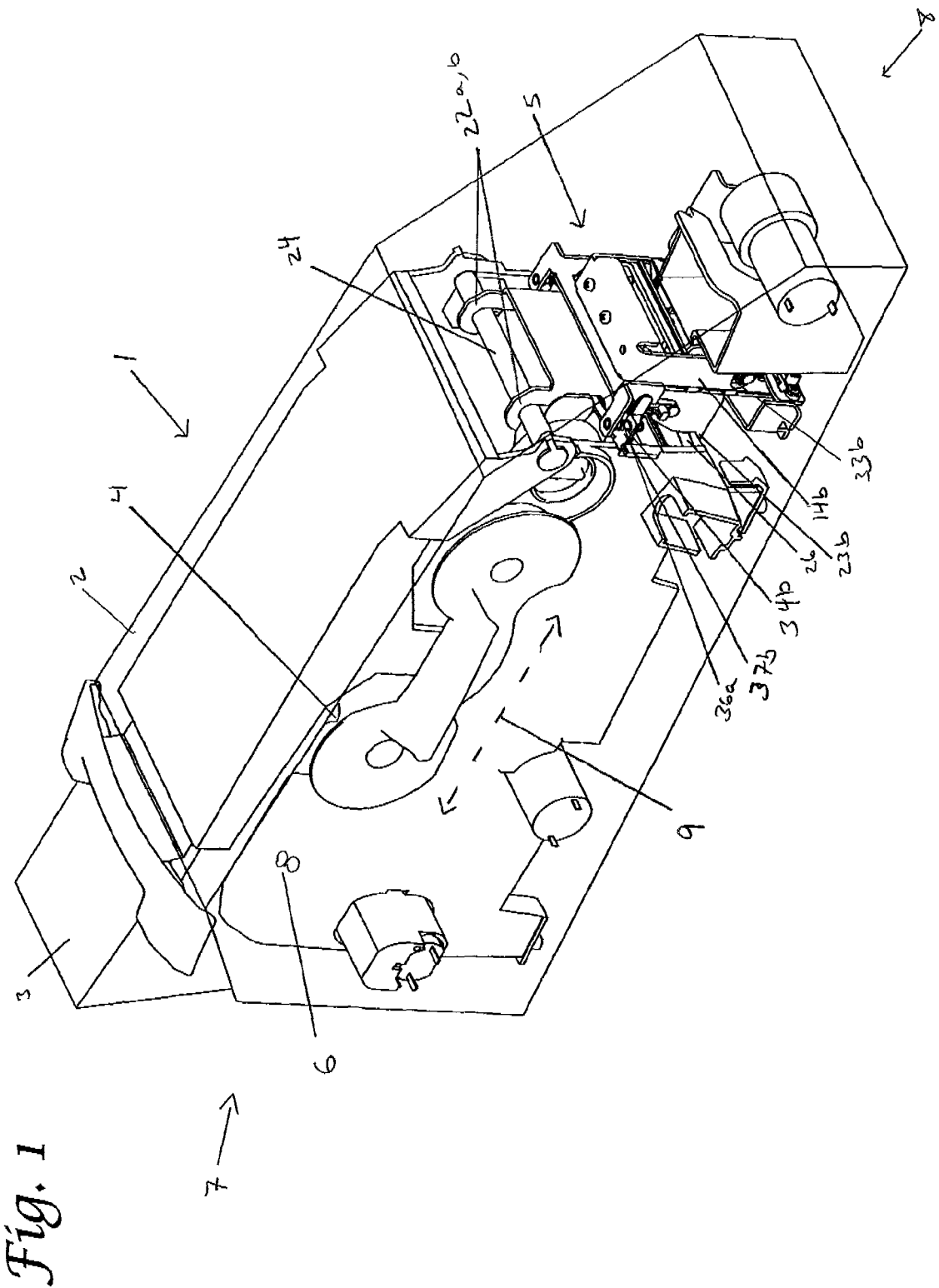
FIG. 1 is a perspective view of one embodiment of a document personalization machine with a single document personalization level employing a dead-end document punch mechanism.

With reference to FIG. 1, a card personalization machine 1 with a single card personalization level employing a dead-end card punch mechanism 5 is illustrated. The card personalization machine 1 includes a housing 2 having an input/output mechanism 3 in the form of a combined input/output hopper which can store a plurality of cards waiting to be personalized, and which stores cards discharged from the housing 2. A personalization mechanism integrated within the housing 2 includes a card personalization mechanism 4, for example a printing mechanism. In addition, a card punch mechanism 5 is provided along a single personalization level. A card transport mechanism 6 is provided for transporting a card through the housing 2 and to and from the personalization mechanism 4 and the card punch mechanism 5.

Further information on housings, input/output mechanisms and card transport mechanisms in card personalization machines can be found in U.S. Pat. Nos. 5,762,431 and 5,886,726 and U.S. Patent Application Publication No. US 2005-0104281 A1.

For convenience in describing the figure, the end of the machine 1 where the input/output mechanism 3 is located will be described as being at a front end region 7 of the housing 2 while the opposite end of the housing 2 will be referred to as a back end region 8.

In operation of the personalization machine 1, a card is fed from the input/output mechanism 3 into the housing 2. As an alternative to having the input/output mechanism 3, the machine housing 2 can have a slot whereby a user manually feeds a card into the machine housing 2.

Once a card enters the housing 2, the card transport mechanism 6 transports the card through the interior of the housing 2. The transport mechanism 6 moves the card along a transport path 9 using a series of rotating nip rollers or other transport mechanisms known in the art. The card transport mechanism 6 is configured such that a card entering from the input/output mechanism 3 travels along the transport path 9 from the front end region 7 of the housing 2 toward the back end region 8.

The card transport mechanism 6 first transports the card from the input/output mechanism 3 to the personalization mechanism 4. The personalization mechanism 4 performs a desired personalization operation on the card. The desired personalization can include one or more of printing, embossing, laminating, laser engraving, magnetic stripe encoding, programming of a chip embedded in the card, and the like. The card transport mechanism 6 then transports the card from the personalization mechanism 4 to the card punch mechanism 5, if necessary, to form a punch hole in the card.

As shown in FIG. 1, the card punch mechanism 5 is located at the back end region 8 of the housing 2. Punching of the card by the dead-end card punch mechanism 5 can be the last operation performed by the machine 1 prior to discharging the card, or the punching can occur prior to additional personalization. After personalization and punching of the card are complete, the card transport mechanism 6 transports the card back along the card path 9 to the input/output mechanism 3.

In the illustrated embodiment, cards are transported through the machine 1 in a generally horizontal orientation. However in other embodiments, the cards may be transported in a generally vertical orientation.

Figure 2A:
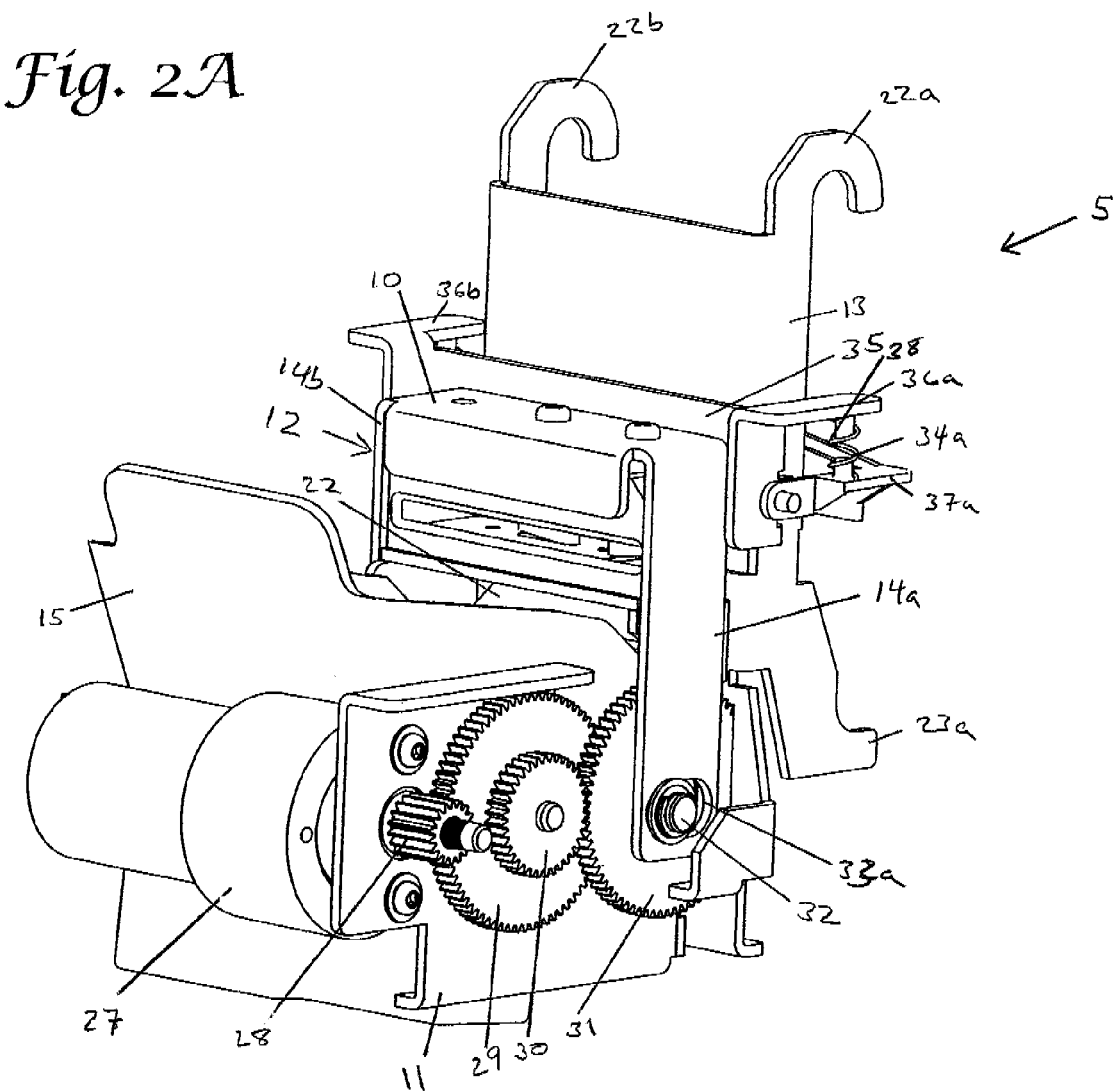
FIG. 2A is perspective view of the dead-end document punch mechanism.
Figure 2B:
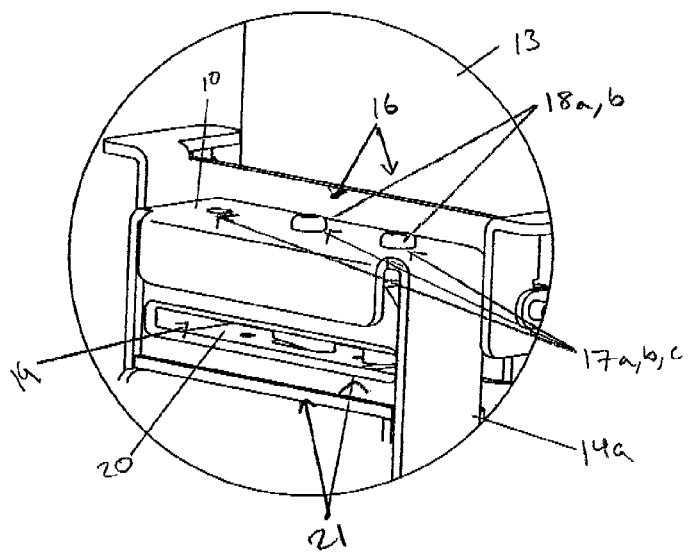
FIG. 2B is an enlarged view of a punch arm of the dead-end document punch mechanism.

With respect to FIGS. 2A and 2B details of the dead-end card punch mechanism 5 are shown. The dead-end card punch mechanism 5 is illustrated as a modular assembly in which the entire mechanism 5 is insertable and removable as a single unit into and from the personalization machine 1, and all elements necessary for the operation of the mechanism 5, except for electrical power and command signals, are integrated into the mechanism 5. In addition, the mechanism 5 is also a fastenerless assembly. By fastenerless, Applicants mean that no screws, bolts, or rivets are used to connect the mechanism 5 to the card personalization machine 1. The modular construction, along with the lack of fasteners, facilitates assembly of the mechanism 5 into the machine 1, thereby reducing assembly costs. An example of a fastenerless connection within a card personalization machine is described in U.S. Patent Application Publication No. US 2005-0104281 A1.

As shown in FIG. 2A, the mechanism 5 includes a fixed chassis that is formed by a side plate 11, a back plate 13 and a spring plate 38 positioned generally behind the back plate 13. The spring plate 38 has two lower spring arms 37a, 37b (see FIG. 1 as well) that extend forward generally horizontally on either side of the back plate 13.

The mechanism 5 also includes a movable punch arm 12 and a waste bin 15. The punch arm 12 has an upper horizontal member 11 and two vertical members 14a, 14b that extend downward on either side of the horizontal member 10. Near the bottom of both the vertical members 14a, 14b of the punch arm 12 is a non-circular slot 33a, 33b. The punch arm 12 also includes a generally vertical back member 35 that has two upper spring arms 36a, 36b that extend backward generally horizontally on each side of the back plate 13. Attached to the bottom of each of the upper spring arms 36a, 36b is a spring 34a, 34b respectively. Attached to the bottom of each of the springs 34a, 34b (spring 34b is shown in FIG. 1) are the lower spring arms 37a, b of the spring plate 38.

The upper region of the punch arm 12 is shown in more detail in FIG. 2B. The upper horizontal member 10 comprises a replaceable punch set 16 made up of one or more punches 18a, 18b mounted into mounting positions 17a, 17b and 17c which permit mounting of punches of various shapes, type and sizes. In the illustrated embodiment the punch arm 12 comprises mounting positions for three punches, however the punch set 16 uses only the two punches 18a, 18b. In other embodiments the punch arm 12 can include more or less punch mounting positions where a punch set 16 can be positioned, and can include more or less punches.

The back plate 13 is a generally vertical surface that includes an opening 19 at the bottom of which is a horizontal card path surface 20, perpendicular to the vertical surface of the back plate 13 and extends underneath the punch arm 12. The opening 19 and the card path surface 20 of the back plate 13 allow a card to travel beneath the punch arm 12 to be punched. The card path surface 20 of the back plate 13 comprises a replaceable die set 21 with one or more dies (not shown) that correspond to the mounting positions 17a, 17b and 17c of the punch arm 12 and the punches 18a, 18b of the punch set 16.

In use, the die set 21 retains remnants of the cards that are punched by the punches. After a number of cards have been punched, lower ones of the remnants retained in the die set 21 will be pushed by newly added remnants through the die set 21 and below the card path surface 20 and into the waste bin 15. The replaceable punch set 16 and the replaceable die set 21 allows the punch hole(s) to be positioned at any location, including the perimeter edges, on the card along an axis perpendicular to the direction of the transport path 9 (shown in FIG. 1).

Beneath the card path surface 20 of the back plate 13 is a remnant or chad ramp 22 that extends downward at an angle towards the waste bin 15, as shown in FIG. 2A. The ramp 22 allows remnants of the cards removed by the card punch mechanism 5 to slide downwards and into the waste bin 15. The waste bin 15 is preferably removable to allow the user to remove the bin and empty the bin of the remnants of the punched cards from the interior of the housing 2. The waste bin 15 can be connected to a removable cover on the housing 2 whereby removal of the cover simultaneously removes the waste bin. Alternatively, the housing 2 can include a movable cover that is moved aside to provide access to the waste bin which is then removed.

The punch arm 12 is driven by a drive train that includes an electric motor 27, for example a DC motor, that is mounted to the side plate 11. The motor 27 drives a pinion 28 that is rotatably affixed to the other side of the side plate 11. A gear 29 is also rotatably affixed to the side plate 11 and is engaged with the pinion 28. A smaller gear 30 is mounted onto the gear 29 and is engaged with a gear 31. The gear 31 is mounted on a cam 32 which eccentrically engages at each end within the slots 33a, 33b formed in the members 14a, 14b.

During a rotation of the gear 31, the eccentric cam 32 engaged within the slots 33a, 33b drives the punch arm 12 and the punches connected thereto downward. As the gear 31 continues to rotate, the punch arm 12 is lifted upward via the upward bias of the springs 34a, 34b acting on the punch arm 12.

In use, a sensor (not shown) detects when a card enters the card punch mechanism 5. Once the card is positioned in the mechanism 5, the motor 27 is electrically energized and the cam 32 is rotated. The cam 32 drives the punch arm 12 downward, driving the punches into the card to create the hole(s). Thereafter, the punch arm 12 is driven vertically upward back to its original position by the springs 34a, 34b. The card is then sent back along the transport path 9 toward the front end 7 of the machine 1.

Returning to FIG. 2A, the mechanism 5 includes a pair of hooks 22a, 22b and a pair of resilient attachment arms 23a, 23b that are integral with the back plate 13. As shown in FIG. 1, the hooks 22a, 22b are designed to hang on a top shaft 24 within the machine 1 and the resilient attachment arms 23a, 23b are designed to snap onto a bottom shaft 26. The hooks 22a, 22b and the attachment arms 23a, 23b form a fastenerless mechanism for detachably connecting the mechanism 5 to the remainder of the machine 1.

Pass-Through Card Punch Mechanism

Figure 3:
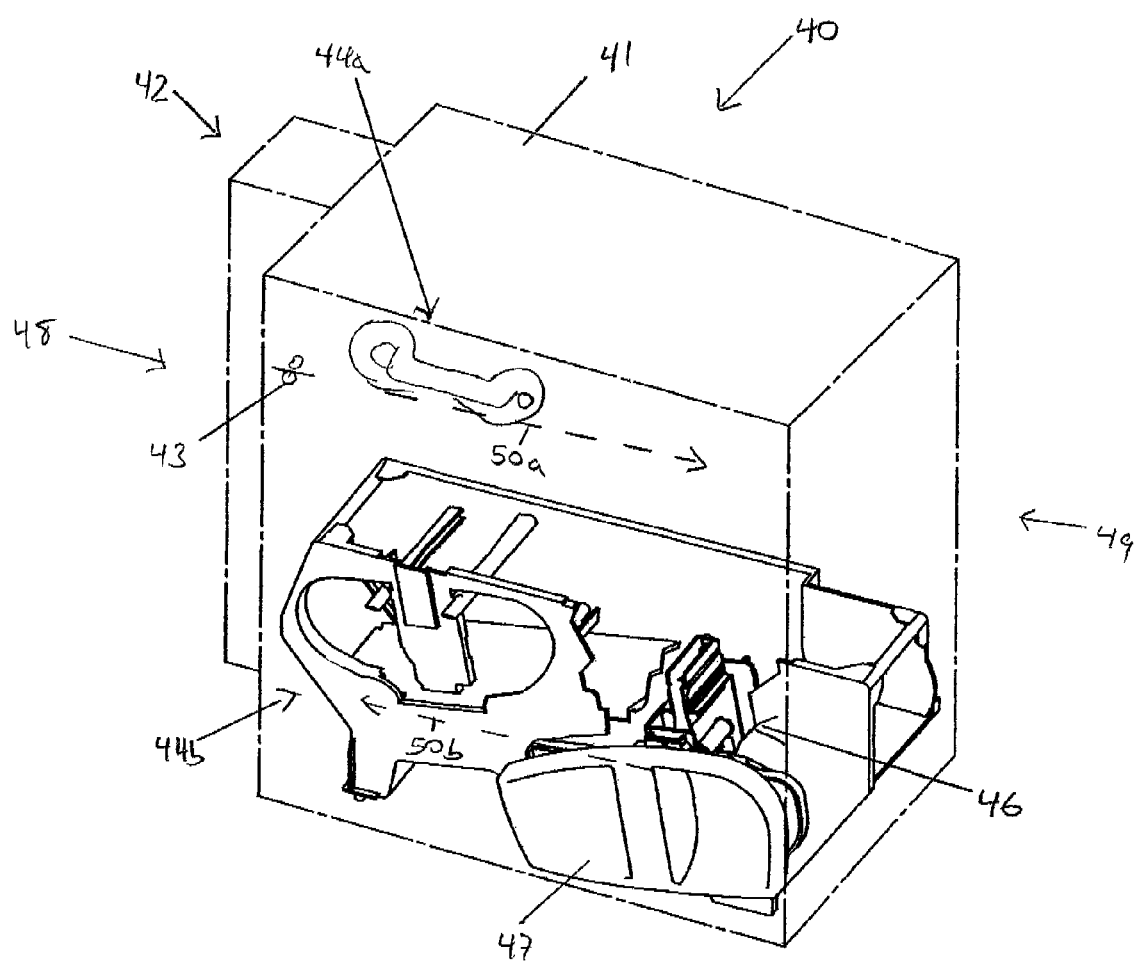
FIG. 3 is a perspective view of another embodiment of a document personalization machine having two vertically separate document personalization levels employing a pass-through document punch mechanism.

With reference to FIG. 3, a card personalization machine 40 with two vertically separate card transport paths 50a, 50b employing a pass-through card punch mechanism 46 is illustrated. The card personalization machine 40 includes a housing 41 having an input/output mechanism 42 in the form of a combined input/output hopper which can store a plurality of cards waiting to be personalized, and which stores cards discharged from the housing 41. A waste bin handle 47 is attached to the housing 41 and allows user access to a waste bin 67 of the card punch mechanism 46. Personalization mechanisms integrated within the housing 41 include one or more card personalization mechanism 44a, 44b, for example a printing mechanism and a laminating mechanism separated along two personalization levels. A card transport mechanism 43 is provided for transporting a card through the housing 41 and to the one or more personalization mechanism 44a, 44b and the card punch mechanism 46.

Further information on a card personalization machine with vertically separate transport paths without a card punch mechanism can be found in U.S. Patent Application Publication No. US 2006-0175395 A1 which is incorporated herein by reference in its entirety.

For convenience in describing the figure, the end of the machine 40 where the input/output mechanism 42 is located will be described as being at a front end region 48 of the housing 41 while the opposite end of housing 41 will be referred to as a back end region 49.

In operation of the personalization machine 40, a card is fed from the input/output mechanism 42 into the housing 41. As an alternative to having the input/output mechanism 42, the machine housing 41 can have a slot whereby a user manually feeds a card into the machine housing 41.

Once a card enters the housing 41, the card transport mechanism 43 transports the card through the interior of the housing 41. The transport mechanism 43 moves the card along a first and second card transport path 50a, 50b using a series of rotating nip rollers or other transport mechanisms known in the art. The card transport mechanism 43 is configured such that a card entering from the input/output mechanism 42 travels along the first transport path 50a from the front end region 48 of the housing 41 toward the back end region 49. Once the card reaches the back end region 49, the card is then sent down to the second transport path 50b, vertically below the first transport path 50a, for transport from the back end region 49 of the housing 41 to the front end region 48.

The card transport mechanism 43 first transports the card from the input/output mechanism 42 to the first personalization mechanism 44a. The first personalization mechanism 44a performs a desired personalization operation on the card. The desired personalization can include one or more of printing, embossing, laminating, laser engraving, magnetic stripe encoding, programming of a chip embedded in the document and the like. The card transport mechanism 43 then transports the card from the first personalization mechanism 44a toward the back end region, and down to the card punch mechanism 46 which forms a punch hole in the card.

As shown in FIG. 3, the card punch mechanism 46 is located at the back end region 49 of the housing 42 along the second transport path 50b. After punching (if necessary) of the card is complete, the card transport mechanism 43 then transports the card to the second personalization mechanism 44b. The second personalization mechanism 44b performs a desired personalization operation on the card. The desired personalization can include one or more of printing, embossing, laminating, laser engraving, magnetic stripe encoding, programming of a chip embedded in the document and the like. The card transport mechanism 43 then transports the card along the second card transport path 50b to the input/output mechanism 42.

In the illustrated embodiment, cards are transported through the machine 40 in a generally horizontal orientation. However in other embodiments, the cards may be transported in a generally vertical orientation.

Figure 4:
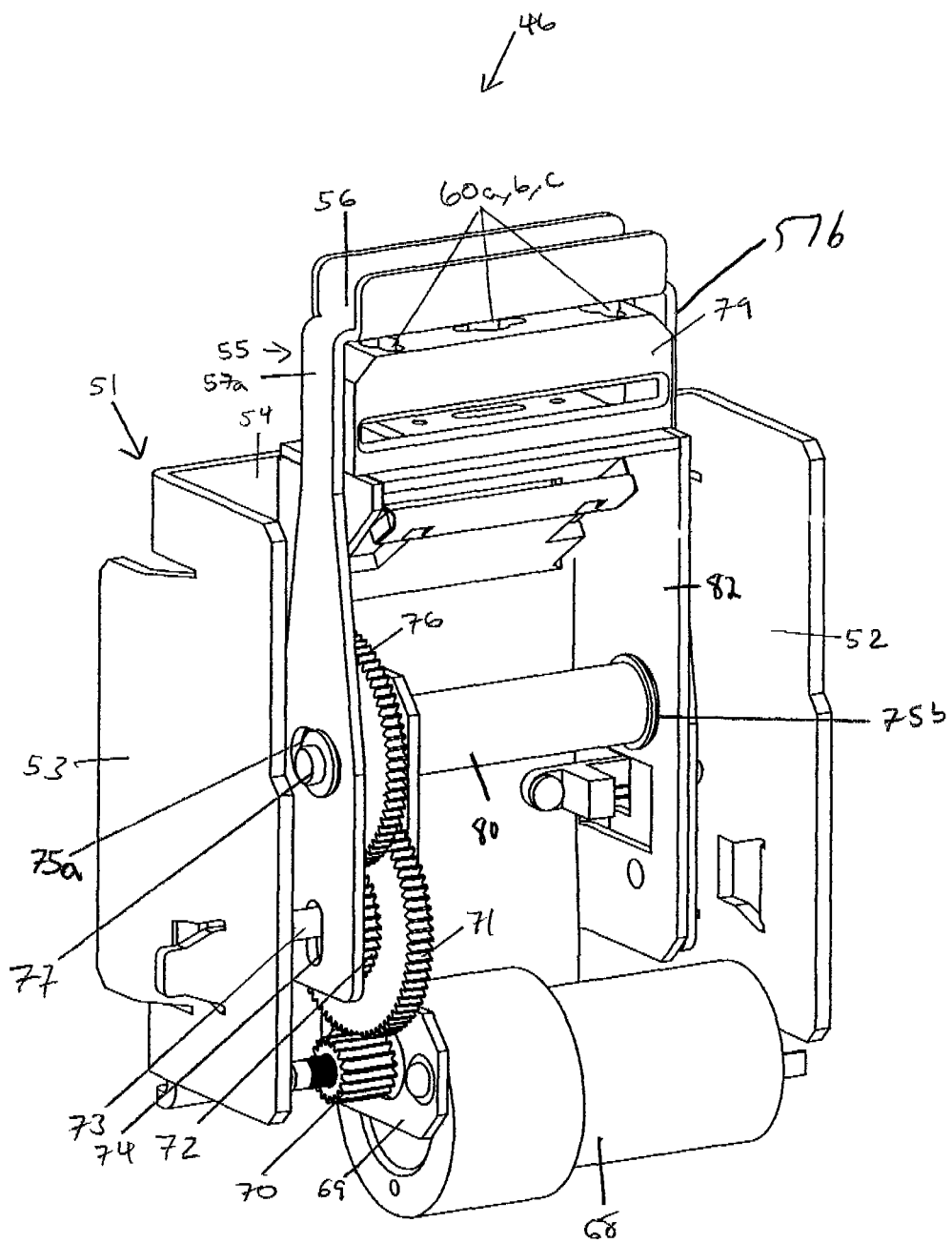
FIG. 4 is a perspective view of the pass-through document punch mechanism.
Figure 5B:
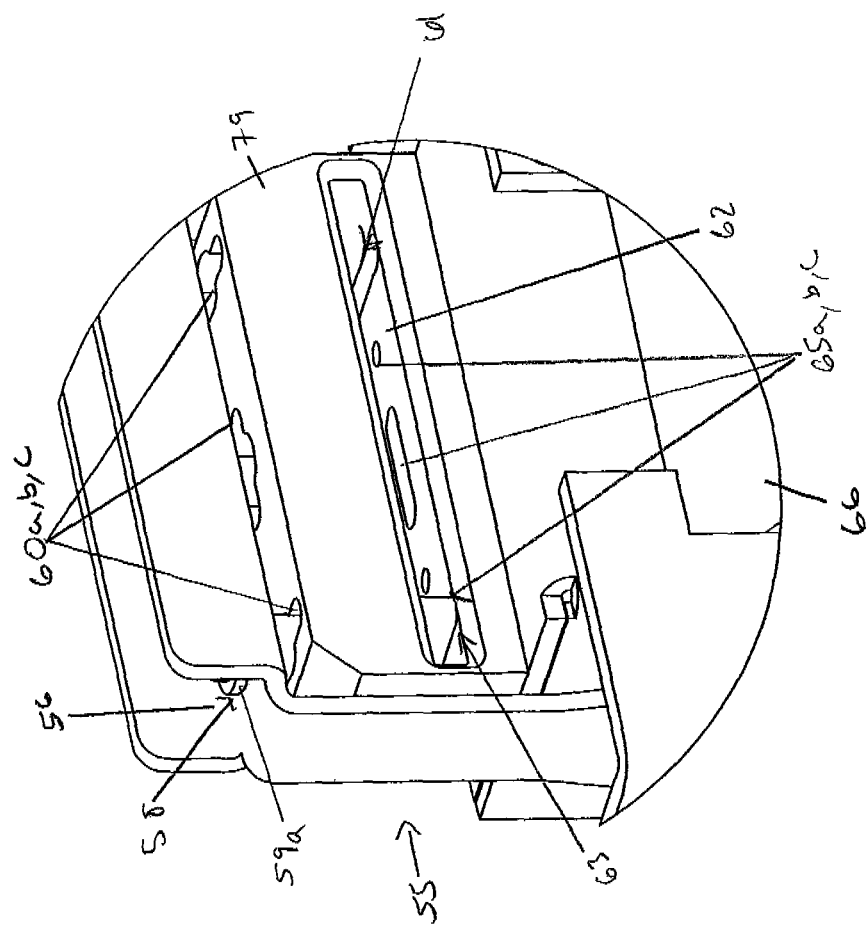
FIG. 5B is an enlarged view of a punch arm of the pass-through document punch mechanism.

With respect to FIGS. 4, 5A and 5B details of the pass-through card punch mechanism 46 are shown. As shown in FIG. 4, the mechanism 46 includes a chassis 51 fixed within the machine housing 41. The chassis 51 is formed by a first side plate 52, a second side plate 53 and a back plate 54. The mechanism 46 also includes a movable punch arm 55 and a fixed card path structure 79. The punch arm 55 has an upper horizontal member 56 and two vertical members 57a, 57b that extend downward on either side of the horizontal member 56. Near the middle of each vertical member 57a, 57b is a slot 75a and 75b. In addition, near the bottom of the vertical member 57a is a slot 74.

The upper member 56 of the punch arm 55 and the fixed card path structure 79 are shown in more detail in FIG. 5B. The fixed card path structure 79 is generally positioned underneath the upper member 56 and has an opening 61 at the bottom of which is a horizontal card path surface 62. The top of the fixed card path structure 79 includes holes 60a, 60b and 60c extending therethrough that receive punches of various shapes, type and sizes. A replaceable punch set 58 made up of one or more punches 59a is fixed to the upper member 56 of the punch arm 55 with the punches extending downward into and through the holes 60a, 60b, 60c. In the illustrated embodiment the card path structure 79 includes holes to receive three punches; however the punch set 58 is illustrated as including only one punch 59a. In other embodiments, a larger or smaller number of holes and punches can be used.

A card travels through the opening 61 of the card path structure 79 beneath the punch arm 55 to be punched. The card path surface 62 includes a replaceable die set 63 with one or more dies 65a, 65b, 65c that correspond in shape to the punches 59a of the punch set 58. In use, the die set 63 retains remnants of the cards that are punched by the punches. After a number of cards have been punched, lower ones of the remnants retained in the die set 63 will be pushed by newly added remnants through the die set 63 and below the card path surface 62 for collection by the waste bin. The replaceable punch set 58 and the replaceable die set 63 allows the punch holes(s) to be positioned at any location, including the perimeter edges, on the card along an axis perpendicular to the direction of the second transport path 50b.

Beneath the card path surface 62 of the card path structure 79 is a remnant or chad ramp 66 that extends downward at an angle towards the waste bin 67 as shown in FIG. 5A. The waste bin 67 is integrally formed with the waste bin handle 47 which is accessible from the exterior of the housing 41 to allow a user to remove the waste bin 67 and remove remnants that are punched from the cards.

The punch arm 55 is driven by a drive train that includes an electric motor 68, for example a DC motor, that is mounted to the inside plate 69. The motor 68 drives a pinion 70 that is rotatably affixed to the other side of the inside plate 69 on one side. A gear 71 is engaged with the pinion 70 and is fixed to a smaller gear 72. The gear 72 is mounted to an axle 73 that extends through the slot 74 and is supported by the second side plate 53. The slot 74 allows the punch arm 55 to move up and down relative to the axle 73.

In addition, the gear 72 is engaged with a gear 76. The gear 76 is mounted on a cam 77 which eccentrically engages within the slot 75a. The opposite end of the cam is engaged in a similar slot (not shown) formed in the member 57b, similar to the embodiment shown in FIG. 1. The cam 77 extends through a sleeve 80 extending between a plate 82 and the plate 69.

During a rotation of the gear 76, the eccentric cam 77 engaged within the slot 75a (and the non-illustrated slot) drives the punch arm 55 and the punches connected thereto downward in order to punch a card. As the gear 76 continues to rotate, the punch arm 55 is lifted upward by the cams 77 and the punch operation is complete.

In use, a sensor (not shown) detects when a card enters the card punch mechanism 46. Once the card is positioned in the mechanism 46, the motor 68 is electrically energized to actuate the punch arm 55 to punch the card. After punching, the card is sent along the transport path 50b toward the front end 48 of the machine 40 for personalization by the personalization mechanism.

Although the dead-end punch mechanism has been described and illustrated as being used on a single-level card personalization machine, it is to be realized that the dead-end punch mechanism could be used on a multi-level card personalization machine like in FIG. 3. In addition, the pass-through card punch mechanism could be used on a single level card personalization machine whereby the pass-through card punch mechanism is followed by another mechanism along the card transport path in the card personalization machine.

The invention claimed is:

1. A card personalization machine comprising:
a machine housing;
a card input whereby a card enters the machine housing;
a card transport mechanism within the housing that transports a card along a transport path through the card personalization machine;
a card personalization mechanism within the machine housing along the transport path that performs a personalization operation on a card; and
a card punch mechanism within the housing at the end of the transport path that creates a punch hole on a card, the card punch mechanism includes a first side and a second side, the first side is closer to the card input and to the card personalization mechanism than the second side is, the card punch mechanism has a card inlet at the first side through which a card to be punched enters the card punch mechanism and a card outlet at the first side through which a card that has been punched exits the card punch mechanism, and the card punch mechanism does not include a card outlet at the second side so that a card does not travel through the second side of the card punch mechanism.

2. The card personalization machine of claim 1, wherein the card punch mechanism includes as punch that is mounted to move linearly in a direction generally perpendicular to the transport path during actuation of the punch.

3. The card personalization machine of claim 1, wherein the card punch mechanism comprises a replaceable punch and die set.

4. The card personalization machine of claim 3, wherein at die of the punch and die set is adjustable to change the position of the punch hole on the card along an axis perpendicular to the direction of the transport path.

5. The card personalization machine of claim 3, wherein the punch and die set determines the size, type and shape of the punch hole created on the card.

6. The card personalization machine of claim 1, further comprising a waste bin that stores remnants punched out of the card.

7. The card personalization machine of claim 6, further comprising a chad ramp disposed beneath the card punch mechanism and that extends to the waste bin.

8. The card personalization machine of claim 1, wherein the punch hole comprises a hole, indentation, perforation, serration, notch or void created on the card.

9. The card personalization machine of claim 1, wherein the card personalization machine is a desktop personalization machine.

10. The card personalization machine of claim 1, further comprising a card output from the machine housing, and the card input and the card output are at the same end of the machine housing, and the card personalization mechanism is between the end of the machine housing where the card input and the card output are located and the card punch mechanism.

11. The card personalization machine of claim 10, wherein the card input and the card output are part of a combined input/output hopper.

12. The card personalization machine of claim 1, wherein the card transport mechanism transports a card in a horizontal orientation along the transport path.

* * * * *